United States Patent
Faynberg et al.

(10) Patent No.: US 8,498,957 B2
(45) Date of Patent: Jul. 30, 2013

(54) OPTIMAL MULTI-FACTOR EVALUATION IN COMPUTING SYSTEMS

(75) Inventors: Igor Faynberg, East Brunswick, NJ (US); Hui-Lan Lu, Marlboro, NJ (US)

(73) Assignee: Alcetel Lucent, Paris (FR)

( * ) Notice: Subject to any disclaimer, the term of this patent is extended or adjusted under 35 U.S.C. 154(b) by 237 days.

(21) Appl. No.: 13/116,263

(22) Filed: May 26, 2011

(65) Prior Publication Data

US 2012/0303571 A1    Nov. 29, 2012

(51) Int. Cl.
*G06N 5/02* (2006.01)

(52) U.S. Cl.
USPC .......................................................... 706/52

(58) Field of Classification Search
USPC ............................................ 706/52; 713/153
See application file for complete search history.

(56) References Cited

U.S. PATENT DOCUMENTS

| 4,914,563 A | 4/1990 | Karmarkar et al. |
| 2003/0154406 A1* | 8/2003 | Honarvar et al. ............. 713/201 |

OTHER PUBLICATIONS

Glynos, D.; Kotzanikolaou, P.; Douligeris, C., "Preventing impersonation attacks in MANET with multi-factor authentication," Modeling and Optimization in Mobile, Ad Hoc, and Wireless Networks, 2005. WIOPT 2005. Third International Symposium on , vol., no., pp. 59,64, Apr. 3-7, 2005.*
"The National Institute of Standards and Technology (NIST) Definition of Cloud Computing," Special Publication 800-145, Jan. 2011, 7 pages.

* cited by examiner

*Primary Examiner* — Jeffrey A Gaffin
*Assistant Examiner* — Ola Olude Afolabi
(74) *Attorney, Agent, or Firm* — Ryan, Mason & Lewis, LLP (57) ABSTRACT

Techniques are disclosed for optimally scheduling computations that involve multiple factors, the cost of evaluations and probabilities of success of which are known. For example, a methodology is provided for determining an optimal schedule of a multi-factor test in sub-quadratic time. While the methodology has wide ranging application, we illustrate a particular applicability to a security application involving multi-factor authentication in a cloud computing environment, as well as applicability to the contact center agent scheduling.

20 Claims, 7 Drawing Sheets

```
Precedes(factor A, B): Boolean
{
        Return (A.c + A.p*B.c < B.c + B.p*A.c);
}
```

```
Merge(factor_list X, Y): factor_list
{
 if Precedes (first(X), first(Y))
   Return (X, Y, Merge(X/first(X), Y/First(Y))
 else
   Return (Y, X, Merge(X/first(X), Y/First(Y))
}
```

```
Order(factor_list: F₁, F₂, ..., Fₙ):factor list
{
  if (n==1)
    Return (F₁)
  else
    if (n==2)
      if Precedes(F₁, F₂)
        Return(F₁, F₂)
      Else
        Return(F₂, F₁)
    Else
    {
      Merge(
        Order( F₁,⋯ , F⌊n/2⌋ ),
        Order( F⌊n/2⌋+1 ,⋯ , F⌊n⌋ ))
    }
}
```

OPTIMAL MULTI-FACTOR EVALUATION IN COMPUTING SYSTEMS

FIELD OF THE INVENTION

The present invention relates generally to computing systems and, more particularly, to techniques for optimally scheduling computations based on testing multiple factors when the costs of performing the tests and probabilities of their outcomes are known, for example, in a secure communication environment and/or a cloud computing environment.

BACKGROUND OF THE INVENTION

Communication and other computing system-based security practices increasingly require multi-factor evaluation. This is especially becoming the case in cloud computing environments. As is known, "cloud computing" is a computing model for enabling ubiquitous, convenient, on-demand network access to a shared pool of configurable computing resources (e.g., networks, servers, storage, applications, and services) that can be rapidly provisioned and released with minimal management effort or service provider interaction, see, e.g., "The National Institute of Standards and Technology (NIST) Definition of Cloud Computing," Special Publication 800-145, January 2011, the disclosure of which is incorporated by reference herein in its entirety.

One example of a communication system-based multi-factor evaluation is authentication, which is the process of confirming the truth of an attribute of an entity, object or data. For example, in the case of a communication system, authentication may involve confirming the identity of a communication device or party, or some object associated with the device and/or party, prior to allowing a communication session to be created or some computing operation to commence. Such a process may involve an evaluation of multiple factors.

Typically, these factors may be characterized by their respective costs (e.g., in terms of execution time or equipment) and a probability to succeed. Since failing only one of these factors could be sufficient to fail the entire test, the order of testing the factors could be essential. It is known that a straightforward approach for minimizing the mathematical expectation associated with such an evaluation results in the execution of a burdensome exponential algorithm.

SUMMARY OF THE INVENTION

Principles of the invention provide techniques for optimally scheduling computations based on testing multiple factors when the costs of performing the tests and probabilities of their outcomes are known, for example, in a communication security environment and/or a cloud computing environment.

For example, in one aspect of the invention, a method comprises determining, via at least one computing device, an optimal schedule for evaluating a multi-factor test, wherein the multi-factor test comprises two or more factors to be tested, with two or more respective costs associated with evaluating the two or more factors and with two or more respective probabilities associated with a given evaluation result for the two or more factors and the optimal schedule minimizing an expectation of an overall cost to evaluate the multi-factor test. The determination of the optimal schedule comprises sorting the factors whereby a first factor is determined to precede a second factor in an ordering of factors when a relation exists whereby a sum of the cost associated with the first factor and a product of the cost of a second factor and the probability associated with the first factor is less than a sum of the cost associated with the second factor and a product of the cost of the first factor and the probability associated with the second factor.

Advantageously, we have developed a methodology for determining an optimal schedule of a multi-factor test. Illustrative principles of the invention provide a sub-quadratic algorithm for determining such an optimal schedule, and further provide for parallelization of the evaluation in the cloud computing environment. In particular, a methodology is provided for scheduling an optimal order of n tests, which involves a sub-quadratic (i.e., $O[n \ln n]$) number of comparisons instead of a naïve exponential (i.e., n!) number of comparisons, i.e., the optimal schedule is advantageously determined in sub-quadratic time. While the principles of the invention have wide ranging application, we illustrate a particular applicability to: (1) a security application involving multi-factor authentication; and (2) scheduling of agents in a contact center.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention will be illustrated below in conjunction with exemplary communication systems as well as other computing systems. It should be understood, however, that the invention is not limited to use with any particular type of communication or computing system. The disclosed techniques are suitable for use with a wide variety of communication systems including but not limited to contact centers, as well as a wide variety of computing systems including but not limited to cloud computing systems. In fact, the disclosed techniques may be implemented in any suitable system wherein it would be desirable to optimally schedule computations based on testing multiple factors.

As used herein, the term "multi-factor" or phrase "multiple factor," associated with a given test (e.g., as will be described below, contact center agent scheduling, cloud computing, authentication), relates to one or more computations involving a test with two or more factors that are to be evaluated or processed. As used herein, "test" is intended to generally refer to any process or operation that is designed to yield some result.

In an illustrative embodiment, the formulation of the problem is as follows. Given n factors, $(F_1, F_2, F_n)$, that need to be tested, with the respective costs of the tests $(c_1, c_2, c_n)$ and respective probabilities of passing these tests $(p_1, p_2, \ldots, p_n)$, what is the permutation $(\pi_1, \pi_2, \ldots, \pi_n)$ that minimizes the mathematical expectation of the overall cost of testing, $E(\pi) = c_{\pi_1} + p_{\pi_1}(c_{\pi_2} + p_{\pi_2}(c_{\pi_3} + \ldots + p_{\pi_{n-1}} c_{\pi_n})) \ldots )$? Of course, in this embodiment, it is to be understood that if the result of testing of any one factor is negative, the entire test is considered failed.

It is important to note that the problem has many applications (including but not limited to, medical tests, software and hardware system tests, compiler and interpreter design, etc.), but it will be illustrated herein below by its applications to a contact center agent scheduling scenario, and performance of multi-factor evaluation in an authentication system.

Some tests, such as those involving biometrics, require substantial central processing unit (CPU) time and additional equipment. Further, in the cloud computing environment, multi-factor authentication must typically take into consideration relationships among a large number of objects, which results in large-scale problems, for which optimization is necessary merely for completing tasks.

Principles of the invention provide for a solution that realizes that instead of comparing n! entities (i.e., mathematical expectations of all test orders), it is sufficient to compare mathematical expectations computed pair-wise. This provides an optimal solution for a large range of problems.

More particularly, we have proven that:

(1) A precedence relation (referred to in the remainder of the Detailed Description as the "above precedence relation") $F_1 \prec F_2$ defined as $F_1 \prec F_2 \equiv c_1 + p_1 c_2 < c_2 + p_2 c_1$ is transitive and therefore defines a total order; and (2) $E(\pi) < E(\pi')$ as long as the former permutation differs from a latter one by a transposition of two out-of-order elements (i.e., $\pi = (I, j) \cdot \pi'$, and $F_i \prec F_j$). This means that a wide variety of sorting techniques known to compare numbers can be applied to sorting the factors, which then are compared based on the above precedence relation. Consequently, only $O(n \ln n)$ computations need to be compared. In one embodiment, we utilize a variant of the well-known sorting algorithm known as Quicksort developed by C.A.R. Hoare in 1960. However, it is to be understood that principles of the invention are not limited to Quicksort or any particular sorting technique.

Therefore, $E(\pi)$ is minimal when $\pi$ corresponds to the sequence of factors sorted according to the above precedence relation. Since sorting to this relation effectively reduces to comparing numbers, as mentioned above, any suitable fast sorting algorithm can be employed.

Figure 1:
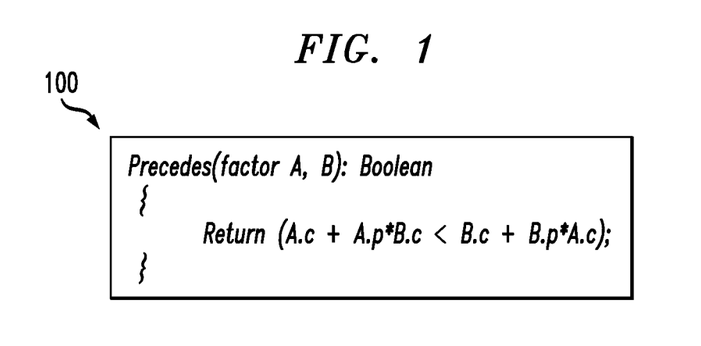
FIG. 1 illustrates a first portion of a methodology for optimally scheduling computations based on testing multiple factors according to an embodiment of the invention.
Figure 2:
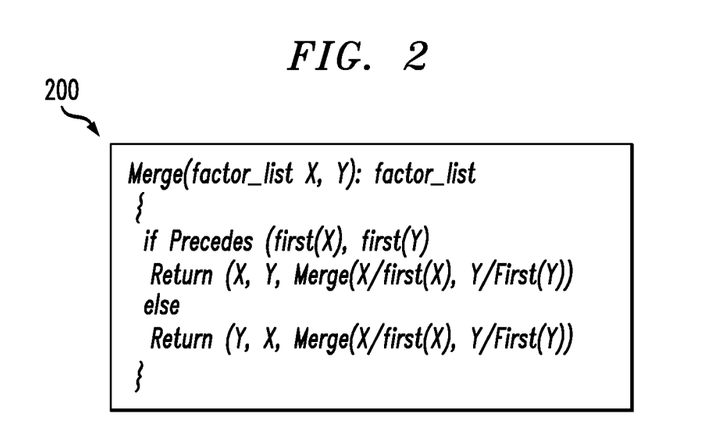
FIG. 2 illustrates a second portion of a methodology for optimally scheduling computations based on testing multiple factors according to an embodiment of the invention.
Figure 3:
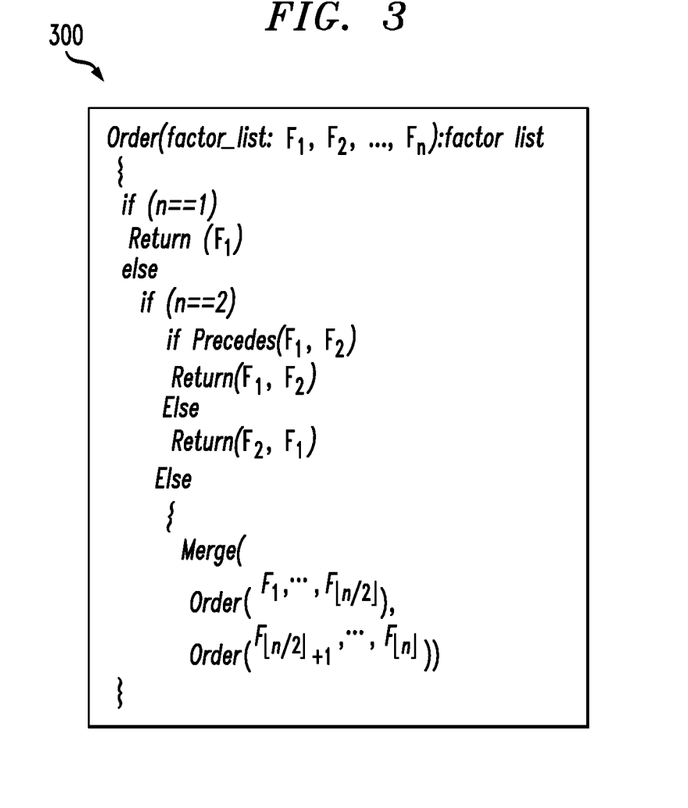
FIG. 3 illustrates a third portion of a methodology for optimally scheduling computations based on testing multiple factors according to an embodiment of the invention.

For example, in one specific embodiment, the following three routines, whose pseudo-code is respectively illustrated in FIGS. 1, 2 and 3), can be executed to perform a methodology for optimally scheduling computations based on testing multiple factors:

1) Precedes (factor A, B): Boolean, which determines if factor A precedes factor B according to the above precedence relation. The routine is depicted as routine 100 in FIG. 1. This routine computes the formula for comparing the factors and reports the result. This routine, in fact, illustratively embodies the principles of the invention. The following two routines, as part of an illustrative embodiment, apply one variant of a sorting algorithm (Quicksort), but as mentioned above, principles of the invention allow any other sorting algorithm to apply as long as the factors are compared using the above precedence relation.

2) Merge(factor_list X,Y): factor_list, which takes as input two lists of factors, sorted by the above precedence relation, and merges them into one factor list. The routine is depicted as routine 200 in FIG. 2. That is, this routine takes two lists of factors, which have already been sorted, and merges them into one list.

3) Order(factor_list: F): factor_list, which takes as an input a list of factors $F = (F_1, F_2, \ldots, F_n)$ and rearranges this list in the ascending order defined by the above precedence relation. The routine is depicted as routine 300 in FIG. 3. This routine actually orders the factors, in that it takes them in any order and returns the ordered list of factors (i.e., returns an optimal schedule for evaluating the factors). For the purposes of this illustrative embodiment, a variant of the Quicksort sorting algorithm is used. First, the routine produces the ordering for the trivial cases when the factor list consists of one or two factors, respectively. Second, the routine breaks the original list roughly in two equal parts (sub-lists), and recursively performs ordering on each of these sub-lists, at which point it merges them into the final list. Note that the Order routine calls the Precedes and Merge routines.

Again, it is to be understood that this ordering routine is one illustrative embodiment that demonstrates how sorting can be done, but any other sorting algorithm or variant thereof can be applied here. See, e.g., D. Knuth, "The Art of Computer Programming," Volume 3, "Sorting and Searching," Second Edition (Reading, Mass.: Addison-Wesley, 1998), ISBN 0-201-89685-0, the disclosure of which is incorporated by reference herein. Again, the above methodology can be used with any other sorting algorithm, and the above methodology can be executed on a stand-alone general purpose computer system or computing device. Also, the above methodology could be executed on a computer system or computing device that is connected to a data communication network (such as local area network (LAN) or the Internet). This latter embodiment is depicted in FIG. 4.

Figure 4:
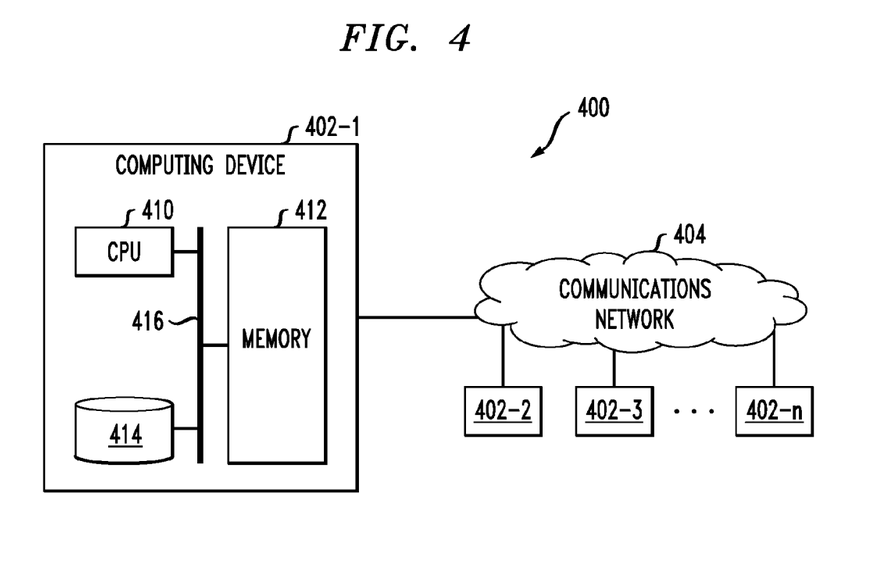
FIG. 4 illustrates a computer system for performing a methodology for optimally scheduling computations based on testing multiple factors according to an embodiment of the invention.

As shown in the distributed system 400 in FIG. 4, a plurality of computing devices 402-1, 402-2, 402-3, . . . , 402-n are coupled to one another via a communication network 404. As mentioned above, the communication network may be a LAN, the Internet, or any other suitable communication network. For instance, the network 404 may be any network across which the devices are able to communicate, for example, a publicly-accessible wide area communication network such as a cellular communication network. One or more of the computing devices 402 could be clients. Examples of client devices that may be employed may include, but are not limited to, cellular phones, smart phones, personal digital assistants, laptop computers, personal computers, etc. One or more of the computing devices 402 could be servers (virtual or otherwise). However, it is to be understood that the protocols and methodologies of the present invention are not limited to the case where the computing systems are clients and/or servers, but instead is applicable to any computing device (stand-alone) or computing devices (distributed system).

As would be readily apparent to one of ordinary skill in the art, the computing devices 402 may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols and methodologies described herein.

Nonetheless, FIG. 4 generally illustrates an exemplary architecture for each computing device 402 communicating over the network. Note that the exemplary architecture is expressly illustrated for computing device 402-1 only for the sake of simplicity, however, it is to be understood that one or more of computing devices 402-2, 402-3, . . . , 402-n may have the same or a similar architecture. As shown, computing device 402-2 comprises a processor (CPU) 410, local memory 412, and hard disk 414, all coupled via a computer bus 416. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM or other local memory, ROM, a fixed memory device (e.g., hard disk drive), or a removable memory device (e.g., diskette or CDROM). Also, memory is one example of a computer readable storage medium. Also, while not expressly shown, the computing device may have one or more input devices (e.g., keyboard, mouse) for inputting data to the processing unit, as well as one or more output devices (e.g., visual display) for providing results associated with the processing unit (collectively referred to as input/output devices or I/O devices). The computing device may also have one or more other components not expressly shown but that are known to be part of a computing device by those of ordinary skill in the art.

Accordingly, software instructions or code for performing the protocols and methodologies of the invention, described herein, may be stored in one or more of the associated memory devices, e.g., ROM, fixed (414) or removable memory, and, when ready to be utilized, loaded into RAM and executed by the CPU (410) in conjunction with its local memory (412).

It is to be appreciated that given the distributed system of FIG. 4, the methodology depicted in FIGS. 1-3 can be executed by one of the computing devices 402, or more than one of the computing devices. Such an interconnection, especially relevant to cloud computing, results in a separate embodiment, in which the computation can be performed in parallel.

Thus, in the case of a standalone computing device scenario, the device's CPU gets input in the form of a series of factor characteristics (i.e., the cost of evaluating a factor and probability of its success), and its output is the optimal order (schedule) of factors.

In the case of a distributed computing device scenario, a protocol for communications among cooperating machines is provided. There are multiple implementations possible here, but in a general case, the initiating machine can use the recursive property of the methodology (FIGS. 1-3) to "subcontract" the computation as depicted in FIG. 5.

Figure 5:
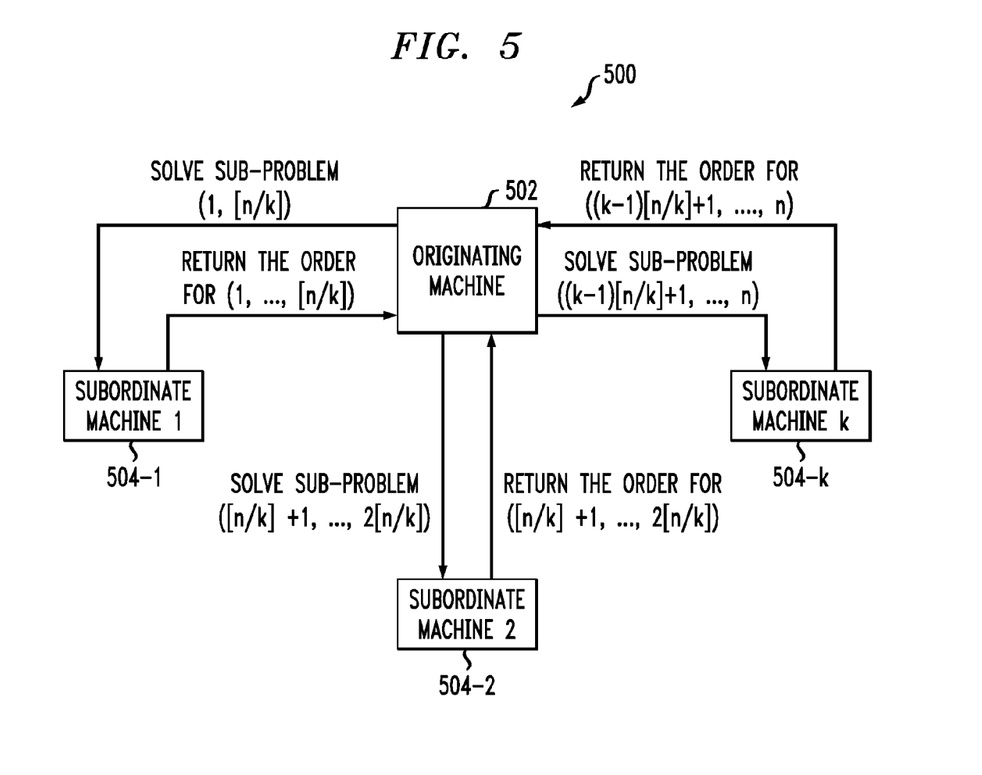
FIG. 5 illustrates a protocol for performing, across a distributed system, a methodology for optimally scheduling computations based on testing multiple factors according to an embodiment of the invention.

The protocol 500 illustrated in FIG. 5 is as follows:

The originating machine 502 issues k requests of the form (Evaluate, [c1, p1], . . . , [ci, pi]) to subordinate machines 504-1, 504-2, . . . , 504-k, each of which contains roughly i=[n/k] (i.e., the highest integer number not exceeding the ratio n/k) consecutive parameters of the original problem. Each of the subordinate machines 504 solves this sub-problem by executing the order function described above (see FIG. 3), and it returns the obtained order in the response (Solution, <order permutation>). When the originating machine 502 receives all k responses, it merges the received sequences, for example, pair-wise, using the above-described Merge procedure (see FIG. 2).

Figure 6:
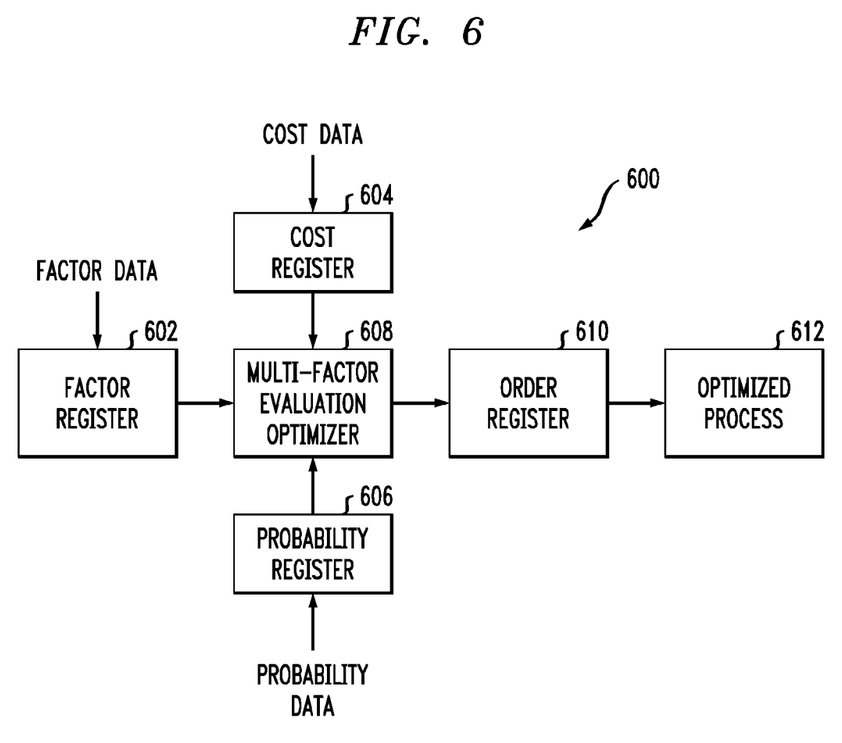
FIG. 6 illustrates a system for optimally scheduling computations based on testing multiple factors according to an embodiment of the invention.

It is to be appreciated that the various software based implementations can also be embodied in hardware, as demonstrated in FIG. 6. That is, FIG. 6 illustrates a system for optimally scheduling computations based on testing multiple factors (i.e., an optimal schedule for performing a multifactor evaluation). Here, the solution is implemented in hardware modules, as follows:

1. The input factor data (i.e., factor data, cost data, and probability data) are respectively placed in a factor register 602, a cost register 604, and a probability register 606, which can be implemented as associative memory;

2. The output order data are placed in an optimized process register 612, which can be implemented as associative memory;

3. A multi-factor evaluation optimizer 608 (for example, realized via micro-programmable firmware) actually performs the evaluation, drawing input flow from the input factor data and depositing the intermediate output into an order register 610, wherein the optimized order is produced in the desired format.

We now present two illustrative embodiments with applications for scheduling calls in contact centers and multifactor evaluation in cloud computing.

Figure 7:
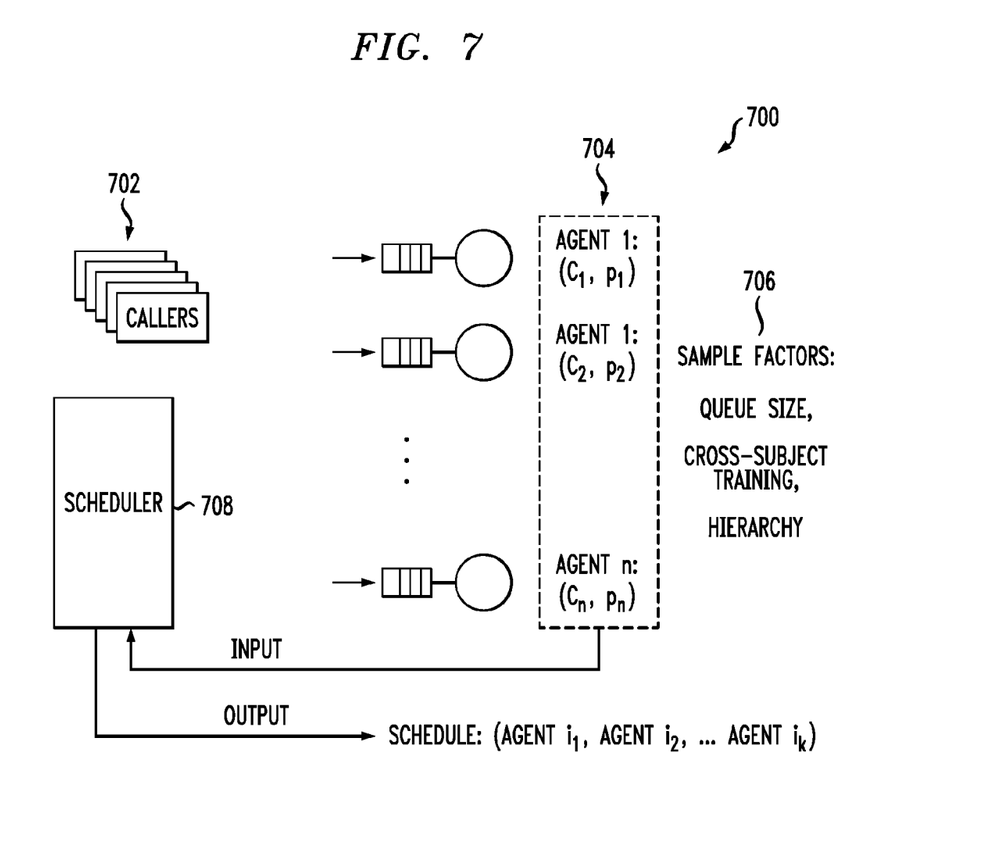
FIG. 7 illustrates a contact center system according to an embodiment of the invention.

The contact center embodiment is depicted in FIG. 7.

Assume that in call center 700, each caller 702 needs to be connected to an agent 704 (which can be either a human or a machine executing an interactive voice response (IVR) script), and, depending on the result, this caller may need to be connected to another agent, and so on. Note that a plurality of callers and agents are shown, however, principles of the invention are not limited to any specific number of callers or agents. In the end, the given caller may need to pass through a chain of agents. It is desirable to determine the optimal chain of agents as early as possible. In this embodiment, principles of the invention are used to determine the optimal sequence of agents that the caller should pass through based on multiple factors.

Agents differ in their expertise (e.g., cross-subject training), hierarchy (e.g., a supervisor, a technical specialist, etc.) and also in their respective queues (list of callers waiting for each agent). This is not a complete list of factors, but these are example factors 706 from which the "cost" of scheduling a particular agent as well as the probability (of the event that this agent will actually solve the caller's problem and thus terminate the chain) can be computed.

FIG. 7 depicts a system 700 in which a scheduler 708 evaluates all given factors (at the time of the arrival of the call) and produces the optimal schedule using the Order algorithm described above (see FIG. 3).

Figure 8:
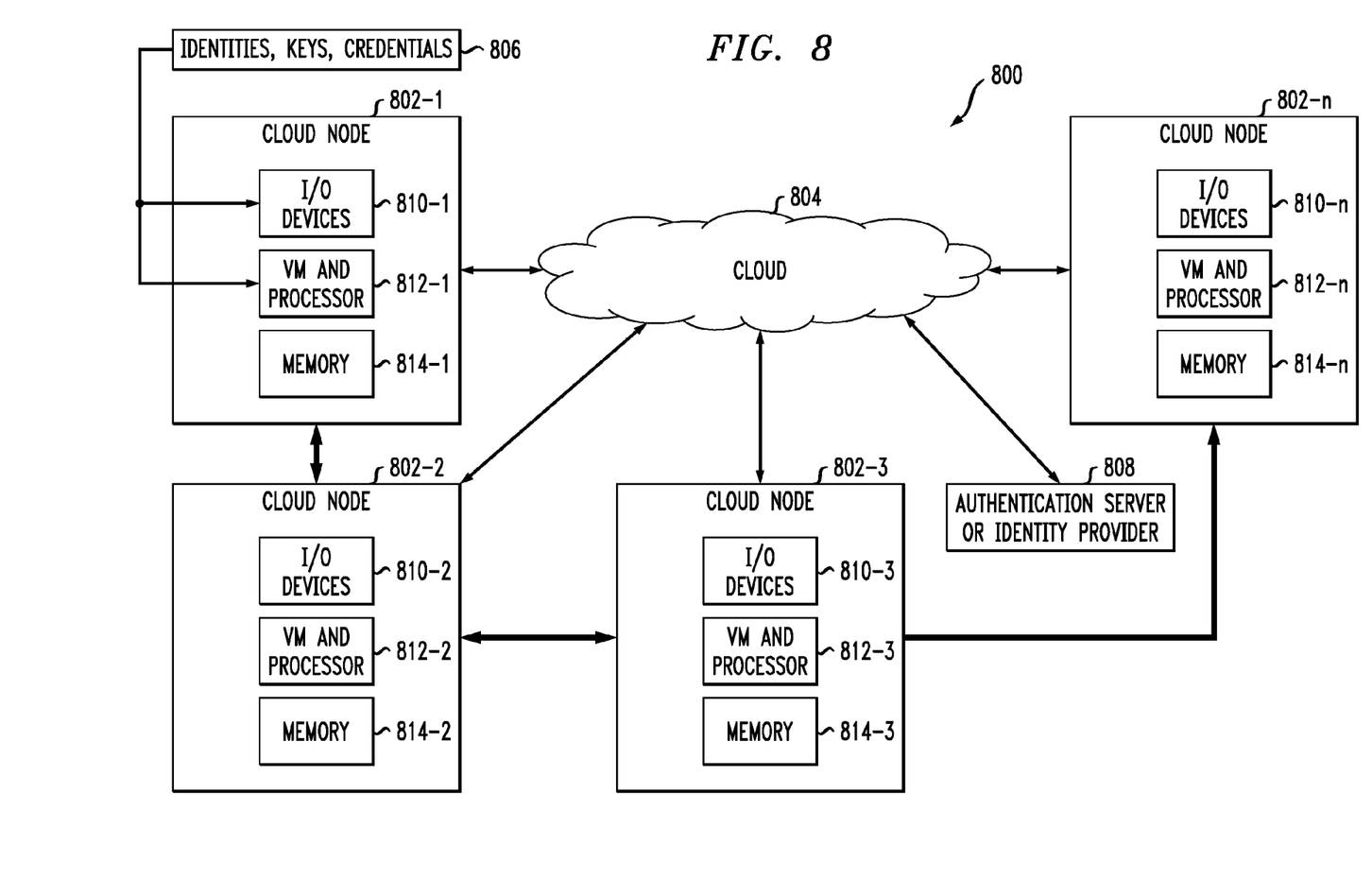
FIG. 8 illustrates a cloud computing system according to an embodiment of the invention.

Another scenario where optimal scheduling is important is multi-factor evaluation in cloud computing, as depicted in FIG. 8. It is important to note that this is by far not the only use of multi-factor evaluation; however, the scale of this type of scenario puts enormous pressure on execution time and thus demands a methodology that is optimal in time. Principles of the invention are used to perform the multi-factor evaluation in this exemplary scenario.

This particular embodiment illustrated in FIG. 8 involves a cloud computing system 800 with multiple cloud nodes 802-

1, 802-2, 802-3, . . . , 802-n, which execute various objects, which can be both user and system programs as well as virtual machines (VMs). For a service to function properly, it is understood that all these objects must be properly authenticated and authorized to execute.

Note that the "cloud" or infrastructure that interconnects the nodes 802 to one another is enumerated in FIG. 8 as 804. Also shown is that each node has identities, keys and/or credentials (collectively enumerated as 806) associated therewith. Also, each node is illustrated as having a processing architecture including, but not limited to, one or more I/O devices 810, a VM/processor 812, and memory 814. Lastly, as illustrated, an authentication server (identity provider) 808 is coupled to the cloud, and thus the nodes 802. It is to be understood that the authentication server 808 performs authentication of the objects of the nodes using one or more of the optimal multi-factor processing methodologies of the invention.

The identities and authentication credentials for the given objects, as well as the cryptographic keys (sometimes permanent, sometimes obtained for specific sessions during authentication) reside in memory 814 and storage I/O devices 810 of the cloud nodes 802. There are typically complex dependencies among these objects, so that authentication of one may depend on the authentication of another, and so on. A certificate chain is a typical example, but there are also more complex ones that can be handled in a straightforward manner by principles of the invention.

In this embodiment, it is assumed that an entity (which can also be distributed) shown as the authentication server (or identity provider) 808 needs to respond as fast as possible to multiple authentication requests. The authentication server knows the identities and relationships among the objects, and therefore it can evaluate the factors and produce the optimal schedule, as demonstrated in FIG. 9.

Figure 9:
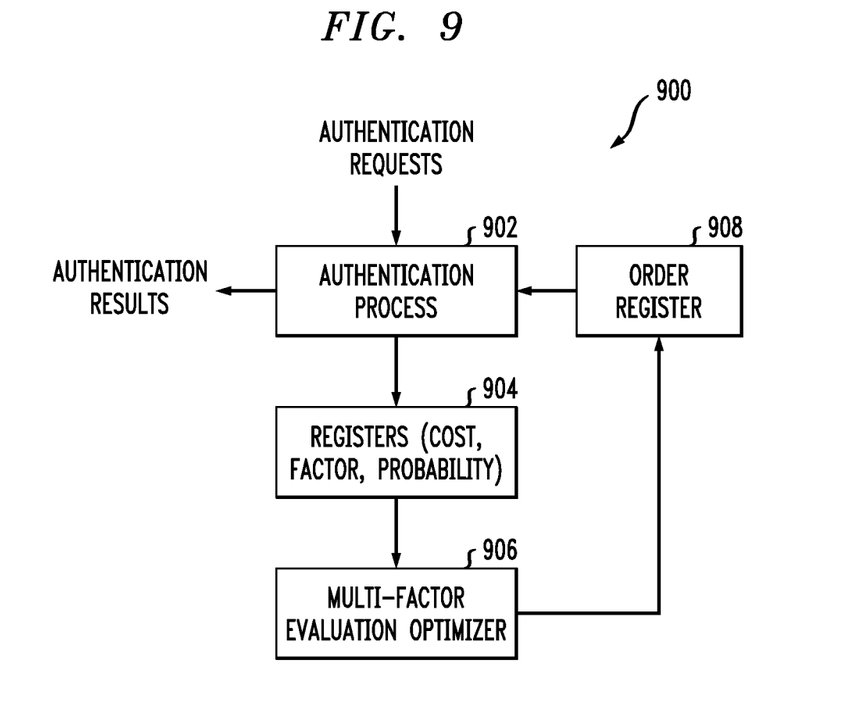
FIG. 9 illustrates an authentication system according to an embodiment of the invention.

FIG. 9 depicts the apparatus 900 for optimizing an authentication process involving multi-factor evaluation (e.g., chain-of-trust validation). Upon receiving an authentication request, the authentication process 902 populates the factor, cost and probability registers 904 (recall description of these registers above in FIG. 6 as 602, 606 and 606) accordingly. Then, the optimizer 906 (recall description of the optimizer above in FIG. 6 as 608, which performs the optimal multi-factor evaluation methodology according to principles of the invention) determines the optimal order of evaluation and feeds it to the authentication process 902 through the order register 908 (recall description of the order register above in FIG. 6 as 610). Finally, the authentication process 902 evaluates the multiple factors in the order prescribed by the optimizer 906 and produces the authentication result.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
 determining, via at least one computing device, an optimal schedule for evaluating a multi-factor test, wherein the multi-factor test comprises two or more factors to be tested, with two or more respective costs associated with evaluating the two or more factors and with two or more respective probabilities associated with a given evaluation result for the two or more factors and the optimal schedule minimizing an expectation of an overall cost to evaluate the multi-factor test;
 wherein the determination of the optimal schedule comprises sorting the factors whereby a first factor is determined to precede a second factor in an ordering of factors when a relation exists whereby a sum of the cost associated with the first factor and a product of the cost of a second factor and the probability associated with the first factor is less than a sum of the cost associated with the second factor and a product of the cost of the first factor and the probability associated with the second factor.

2. The method of claim 1, wherein the optimal schedule determination step is performed in sub-quadratic time.

3. The method of claim 1, further comprising the step of performing the multi-factor test based on the optimal schedule.

4. The method of claim 3, wherein the multi-factor test is performed based on the optimal schedule by the at least one computing device.

5. The method of claim 3, wherein the multi-factor test is performed based on the optimal schedule by one or more other computing devices.

6. The method of claim 1, wherein the optimal schedule is determined by the at least computing device and at least one other computing device.

7. The method of claim 1, wherein the first factor and the second factor form a factor pair when the first factor is determined to precede the second factor in accordance with the given relation.

8. The method of claim 1, wherein the expectation of the overall cost to evaluate the multi-factor test is determined by comparing expectations for given factor pairs.

9. The method of claim 1, wherein the optimal schedule determination step further comprises splitting the two or more factors into two sub-lists, and recursively performing ordering on each of these sub-lists according to the precedence relation.

10. The method of claim 9, wherein the optimal schedule determination step further comprises merging the two ordered sub-lists into a final factor list which represents the optimal schedule for evaluating the factors.

11. The method of claim 1, wherein the optimal schedule represents an order of agents that a caller is to pass through in a contact center to resolve an issue.

12. The method of claim 11, wherein the two or more factors to be evaluated represent two or more characteristics associated with the agents of the contact center.

13. The method of claim 1, wherein the optimal schedule represents an order associated with one or more requests to authenticate objects submitted to an authentication process by nodes in a computing system.

14. The method of claim 13, wherein the two or more factors to be evaluated represent two or more relationships associated with the object to be authenticated.

15. The method of claim 13, wherein the computing system is a cloud computing system.

16. Apparatus, comprising:
 one or more memories; and
 one or more processor devices operatively coupled to the one or more memories and configured to determine an optimal schedule for evaluating a multi-factor test, wherein the multi-factor test comprises two or more factors to be tested, with two or more respective costs associated with evaluating the two or more factors and with two or more respective probabilities associated with a given evaluation result for the two or more factors and the optimal schedule minimizing an expectation of an overall cost to evaluate the multi-factor test;

wherein the determination of the optimal schedule comprises sorting the factors whereby a first factor is determined to precede a second factor in an ordering of factors when a relation exists whereby a sum of the cost associated with the first factor and a product of the cost of a second factor and the probability associated with the first factor is less than a sum of the cost associated with the second factor and a product of the cost of the first factor and the probability associated with the second factor.

17. The apparatus of claim 16, wherein the optimal schedule determination is performed in sub-quadratic time.

18. The apparatus of claim 16, wherein the one or more processor devices are further configured to perform the multi-factor test based on the optimal schedule.

19. The apparatus of claim 16, wherein the optimal schedule represents an order of agents that a caller is to pass through in a contact center to resolve an issue, and the two or more factors to be evaluated represent two or more characteristics associated with the agents of the contact center.

20. The apparatus of claim 16, wherein the optimal schedule represents an order associated with one or more requests to authenticate objects submitted to an authentication process by nodes in a cloud computing system, and the two or more factors to be evaluated represent two or more relationships associated with the object to be authenticated.

\* \* \* \* \*